United States Patent [19]

O'Neill

[11] 4,153,373

[45] May 8, 1979

[54] APPARATUS AND PROCESS FOR PREPARING CALCINED GYPSUM

[75] Inventor: Eugene E. O'Neill, Okeene, Okla.

[73] Assignee: United States Gypsum Company, Chicago, Ill.

[21] Appl. No.: 788,953

[22] Filed: Apr. 19, 1977

Related U.S. Application Data

[63] Continuation-in-part of Ser. No. 777,213, Mar. 14, 1977.

[51] Int. Cl.² .............................................. B01F 15/02
[52] U.S. Cl. ..................................................... 366/165
[58] Field of Search ............... 423/555, 165, 172, 171; 366/165, 131, 194, 196, 279, 314, 330

[56] References Cited

U.S. PATENT DOCUMENTS

| 1,371,581 | 3/1921 | Steffes | 423/172 |
| 1,713,879 | 5/1929 | McAnally | 423/172 |
| 1,983,319 | 12/1934 | Simpson | 366/165 |
| 2,177,668 | 10/1939 | Marsh | 423/172 |
| 3,236,509 | 2/1966 | Blair | 423/172 |
| 3,856,269 | 12/1974 | Fothergill | 366/165 |
| 4,021,021 | 5/1977 | Hall | 366/165 |

FOREIGN PATENT DOCUMENTS 686873 5/1964 Canada ..................................... 366/167

Primary Examiner—Robert W. Jenkins
Attorney, Agent, or Firm—Robert H. Robinson; Kenneth E. Roberts

[57] ABSTRACT

An apparatus and process for preparing calcined gypsum which comprises continuously treating a mass of calcined gypsum by adding, with thorough blending, metered portions of water to the calcined gypsum. The water is incorporated into the calcined gypsum as a continuous, free-falling stream immediately after the gypsum enters the blender container near the top of its sidewall. The water must be added carefully so as not to contact either the side wall of the blender container or the propeller blade mounted in the center of the apparatus on a shaft projecting upwardly from the bottom and with the propeller spaced from the bottom of the container. The water is added in amounts ranging from about 1 to about 16% of free water by weight of the calcined gypsum fed to the blender apparatus. The calcined gypsum fed to the blender, after adding the water, is swept down the side wall of the container, flows around the propeller, and then is swept up the side wall to an exit port preferably located near the top of the side wall and near the port where the gypsum enters the container.

10 Claims, 1 Drawing Figure

APPARATUS AND PROCESS FOR PREPARING CALCINED GYPSUM

CROSS-REFERENCE TO RELATED APPLICATION

This application is a continuation-in-part of U.S. Pat. application Ser. No. 777,213 filed on Mar. 14, 1977 and now pending in the U.S. Patent and Trademark Office.

BACKGROUND OF THE INVENTION

This invention relates to an apparatus and process for preparing calcined gypsum whose properties in general, e.g., set time, pouring consistency, rate of strength development and other properties, are particularly adapted for use in gypsum board manufacture. The invention also relates to a process for continuously treating calcined gypsum to produce a healed calcium sulfate hemihydrate having properties of low water demand, which provides significant energy savings, yet retaining other properties required for use in gypsum board production.

Continuous calcination of gypsum, such as disclosed in U.S. Pat. No. 3,236,509, is of importance in the economical production of gypsum stucco (calcium sulfate hemihydrate) especially adapted for use in gypsum board manufacture. The properties required of gypsum stucco used in gypsum board manufacture on modern automatic machinery differ substantially from the properties required for so-called bag plaster usually made in kettles operated by batch techniques. It has been found that stucco produced by the continuous process differs principally from batch process stucco in aging and setting properties. Because the continuously produced stucco is not going to be stored for any appreciable period of time, but rather is going to be utilized immediately or shortly after calcination in gypsum board manufacture, the gypsum material does not need to exhibit long-term stability.

In automated gypsum board manufacture a large portion of the processing time and processing energy is devoted to removing excess water from the wet board. Considerable excess water is required in gypsum board manufacture to properly fluidize the calcined gypsum and obtain proper flow of the gypsum slurry. Thus, calcined gypsum made by continuous calcination will have a dispersed consistency of about 120–200 cc. This relates to a water usage of 85–100 parts of water per 100 parts of the calcined gypsum in a modern automated gypsum board plant. The theoretical water required to convert the calcined gypsum (calcium sulfate hemihydrate) to set gypsum dihydrate is only 18.7% by weight on a pure basis. This leaves about 67% to about 82% of the water present in the gypsum slurry which must be removed in drying the board.

For a considerable time the art has sought to reduce the cost and increase the line speed in the manufacture of gypsum board. This could be accomplished, if effective practical means could be found, by reducing the amount of water required to properly fluidize the calcined gypsum supplied to the automatic board production machinery. That is, if the water demand required for dispersed consistency could be reduced approximately 20–50%, then there would be corresponding less free water to be removed from the wet slurry of the board. This effectively would lower the energy required in drying a given volume of wet board and allow either less time in the drying ovens, lower temperature to effectuate complete drying in the ovens, or both.

Methods of producing artificially aged or low consistency kettle stucco have been accomplished using batch kettle operations. Thus, the so-called "aridizing process" disclosed by Brookby in U.S. Pat. No. 1,371,581 and subsequent patents related thereto have disclosed the addition of a deliquescent substance such as a chloride of an alkaline earth metal into the stucco during the batch kettle calcination. However, this method is not effective with continuously calcined gypsum. Further, the addition of salt is undesirable for the reason that this hygroscopic impurity is very deleterious to board qualities such as plastic flow and bond of paper to core.

It has also been long recognized in the art of batch calcination that artificial aging could be accomplished with water addition. One such attempt is described in U.S. Pat. No. 1,713,879 in which either "single boil" or "double boil" calcined gypsum was aged by placing one ton of stucco in a plaster mixing machine and adding water over a five to six minute period. Another such attempt is described in U.S. Pat. No. 2,177,668 in which calcined gypsum having a combined moisture content of about 2% (showing the presence of much active anhydrite) was exposed to a humidified gas such as air at 60% relative humidity until sufficient moisture was supplied to the over-calcined gypsum to rehydrate the anhydrite content to the hemihydrate The calcined gypsum so treated by these processes not only showed a reduction in consistency but also set and hardened more quickly. Thus, for example, a water quenching step which reduced the consistency of the quenched calcined gypsum to a value of 56 immediately shortened the set time to 25 minutes and after aging 14 days exhibited a set of only six minutes.

Obviously, such quick setting material is not suitable, without excessive corrective reformulation, for automated continuous board production, since the slurry mass would begin setting during mixing in the board slurry mixer, thus resulting in poor quality board and considerable equipment shutdown and clean-up. Kinkade and McCleary in U.S. Pat. No. 3,415,910 taught that the quick set deficiency of batch quenched calcined gypsum could be overcome by quenching the calcined gypsum while the mass of calcined gypsum is still hot with considerably large quantities of water to quench the stucco and then stabilizing the material by reheating the kettle contents to about 255° F. This stabilized stucco, so treated, not only showed a reduction in consistency but also showed that the setting time and dispersed surface area did not vary excessively upon aging. Such treatment requires considerable water in cooling down the "hot" stucco and also considerable utilization of energy in both initially heating the stucco before quench and also reheating the quenched stucco to stabilize it. The longer cycle time per batch for the two additional operations would require added capital investment to supply automated board lines and is energy intensive. Further, this process reduces the effective capacity of the kettles by at least 50% and would be economically unfeasible for board manufacture at present fuel and added equipment costs.

One skilled in the art, in view of the above patent literature, would expect that water-treated calcined gypsum would be subject to quick set and would cause immediate setup in processing lines unless stabilized as taught in Kinkade et al. Attempts to adapt the water treatment alone to continuous calcination resulted in products exhibiting incomplete treatment, shortening of set time, and high energy consumption. Thus, while these treatments have been employed for batch operations, it has been commonly recognized that they are not suitable for continuously calcined gypsum for utilization in gypsum board manufacture under automated processes.

SUMMARY OF THE INVENTION

A principal object and advantage of the present invention is the provision of a process for continuously treating calcined gypsum (calcium sulfate hemihydrate) so as to lower the water demand.

A further object is the provision of apparatus for blending water and calcined gypsum in a manner which prevents build-up of gypsum (hydrated calcium sulfate) in the apparatus and avoids excessive agglomeration of the calcined gypsum particles.

Still another object is the provision of a process for treating calcined gypsum so as to substantially reduce water requirements of the calcined gypsum on subsequent use by about 20–30%.

The fulfillment of these and other objects and advantages of the present invention are accomplished by homogeneously blending water continuously into a flowing stream of calcined gypsum so as to incorporate about 1–16% of free water into the calcined gypsum stream present in the blending apparatus. The treated gypsum mass may subsequently be continuously fed into the slurry mixer of an automated gypsum board line.

In one embodiment, about 50% to about 75% by weight of the calcined gypsum feed to a gypsum board production line is diverted and treated with a continous stream of free-falling water and homogeneously blended to add approximately 6% of free water into that portion of the calcined gypsum stream. The treated stream is recombined with the stream of untreated calcined gypsum with agitation to obtain a total net incorporation of about 3–4% free water into the total re-blended stream. The recombined stream may be allowed to heal or age for about one to two minutes before entering the slurry mixer of the automated gypsum board production.

As previously mentioned, water "aging" of plaster has been known for many years, however, it has not been extensively used because of the tendency of the treated gypsum to quick set during storage and the problem of material (treated gypsum) buildup on the mixing equipment. In accordance with this invention, the water is added to the calcined gypsum immediately after the gypsum stream enters the blender apparatus. A continuous stream of free-falling water (unpressurized) is directed into the calcined gypsum, with great care being exercised to avoid splashing the water on the apparatus side wall and the propeller used to homogeneously blend the treated calcined gypsum.

Early attempts at blending the water and the calcined gypsum were not successful because the amount of calcined gypsum material being treated with water and blended was too large to be handled by the apparatus. At first, pressurized air was introduced into the calcined gypsum stream, but this was unsatisfactory because the stream became so loose that the water being added dropped all the way through the gypsum into contact with the mixing propellers or the container wall. It was finally determined that the quantity of calcined gypsum had to be fairly small and moving briskly rather than trying to move a large quantity more slowly.

It was discovered that a propeller used on an outboard motor for a boat provided the proper mixing action. The propeller is mounted on a shaft in the bottom of the apparatus container and is spaced from the bottom. The water is introduced into the calcined gypsum stream near the top of the container. The mixing action causes the treated gypsum to be swept down the sides of the container and to pass around (above and beneath) the propeller blades. The treated gypsum then continues up the other side of the container and out the exit port, having traveled almost completely around the container. A portion of the treated gypsum may make more than one pass around the container. This apparatus and the mixing action provided thereby results in a vortex being formed above the propeller, and it is believed that there is a portion of relatively dry, non-moving gypsum immediately beneath the propeller. In general, the propeller should rotate at about 100 to about 500 r.p.m., however, this may vary. The pitch of the propeller blades may also vary, and outboard motor propellers are available having a pitch ranging from about 8 inches to about 16 inches. The speed of the propeller and/or the pitch of the blades may be selected to give the proper mixing action.

The above described procedure whereby only a portion of the gypsum feed is treated produces the effect of uniformly healed material even though only about half of the total was initially treated with water. Calcined gypsum is a highly dynamic system which changes in relation to time, temperature and humidity. The industry has spent considerable time and money to obtain uniform consistency through moisture venting, bin storage rotation and the like, but such efforts have not achieved the great reduction in dispersed consistency and water requirement accomplished by this invention. The calcined gypsum prepared in accordance with this invention provides uniform set and greatly reduced water demand not realized before in producing calcined gypsum.

DESCRIPTION OF THE PREFERRED EMBODIMENTS

Figure 1:
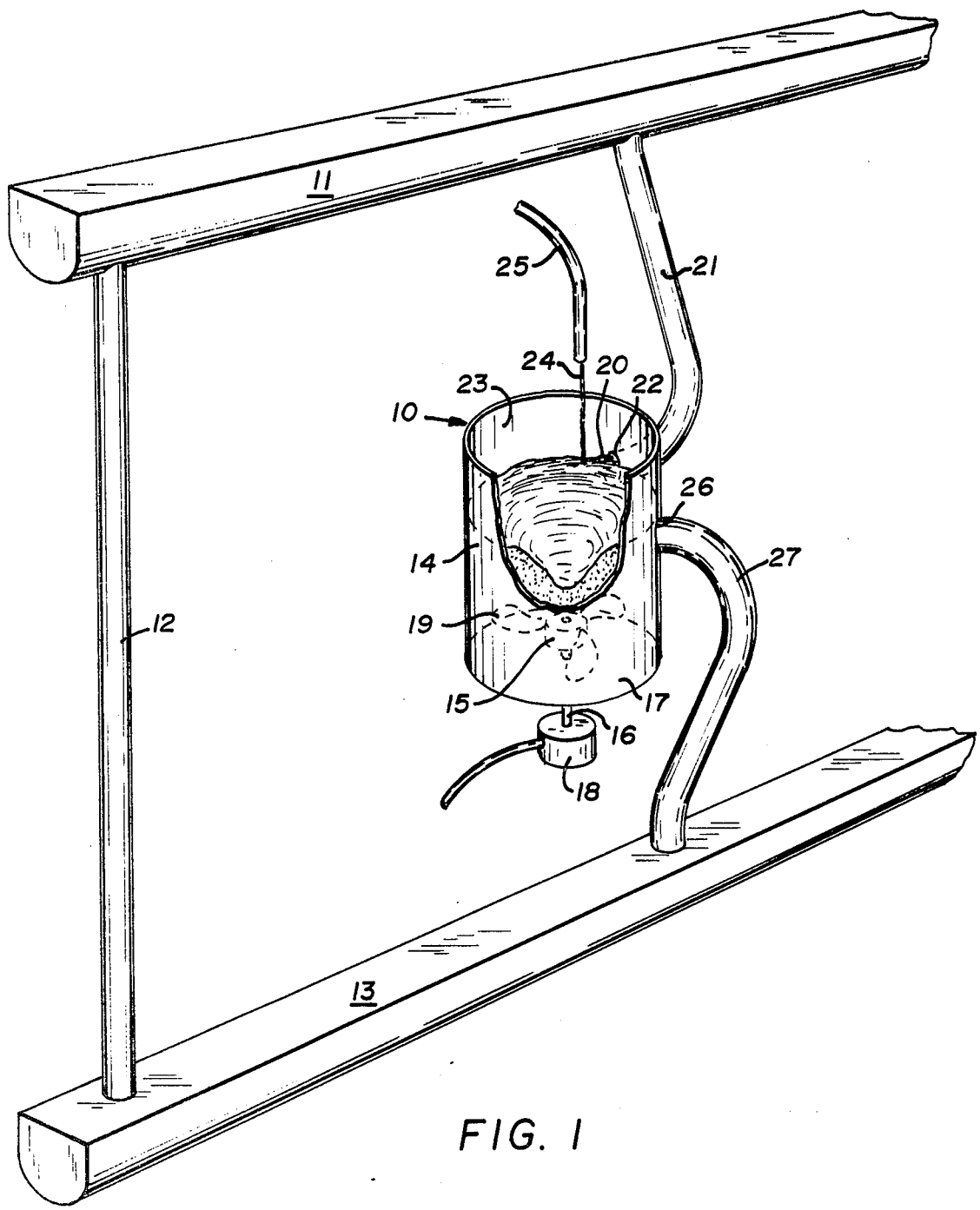
FIG. 1 is an illustration of the blender apparatus used to prepare calcined gypsum in accordance with this invention.

Although the capacity for water "aging" of plaster has been known for some time in batch processes, it has not been utilized on a continuous basis because of the deleterious side effect of quick set normally associated with water-treated stucco that has not been reheated, and material handling problems. Also, no one has found a process for accomplishing this without plugging up the equipment. Attempting to incorporate the proper amount of water in ordinary mixing equipment results in serious lumping and build-up of the lumps on the equipment. It was therefore unexpected that splitting the stream of feed to the gypsum board production equipment and treating only about half of the stream by metering in small amounts of water (rate of about 1–3 gallons of water per minute to approximately 5 tons per hour of continuous board stucco feed) and then recombining this stream with the untreated stream in an ordinary screw-conveyor, would result in a uniform homogeneous blending of material, without lumping and without physical handling difficulties. In practical terms, 8 gallons of water per minute were removed from the water requirements for the slurry and the board mixing apparatus.

The calcined gypsum material treated in accordance with the process of this invention is not critical and any conventional calcined gypsum feed for a board machine may be utilized. It is preferred that the calcined gypsum be any continuously produced stucco having a seven second dispersed consistency of about 100–160 cc, but of course, this may vary depending upon manufacturing procedure well known to those skilled in the art.

Referring now to the drawing, FIG. 1 illustrates the blender apparatus (10) used to prepare calcined gypsum in accordance with this invention. Calcined gypsum is fed to the blender (10) through a screw conveyor (11). Duct means (12) is provided to convey a portion of the calcined gypsum around the blender (10) and into a second screw conveyor (13) where it is recombined with treated gypsum which has passed through the blender (10) wherein water is incorporated into the hot calcined gypsum. If desired, a valve (not shown) could be placed in duct means (12) to control the amount of calcined gypsum which is diverted to the blender (10). If the valve were closed, all of the calcined gypsum could be conveyed to the blender (10).

The blender apparatus (10), which is an essential feature of this invention, comprises a container (14) with a propeller (15) mounted on a shaft (16) passing through the bottom (17) of the container (14). It is preferred that the propeller (15), which may be a standard outboard motor propeller, be spaced from the bottom (17) to permit the treated calcined gypsum to pass around (above and beneath) the propeller (15). It may be possible to mount the propeller (15) almost flush with the bottom. The propeller (15) is rotated or powered by an air motor (18), however, other equivalent power sources, such as an electric motor, could be used. It is generally preferred that the propeller (15) be rotated at about 100 to about 500 revolutions per minute (r.p.m.), however, this will vary depending upon factors such as the pitch of the propeller blade (19) and the consistency of the treated gypsum.

The calcined gypsum (20) is transported from the screw conveyor (11) through a hose or flexible tube (21) and enters the blender container (14) through an entry port (22) located near the top of the container side wall (23). The hose or tube (21) is not perpendicular to the side wall (23), for it is tangentially attached to facilitate the calcined gypsum (20) in moving along the side wall (23). Immediately after the calcined gypsum (20) enters the container (14), a continuous stream of free-falling water (24) is directed into the calcined gypsum (20) which is flowing through the entry port (22). The water is transported from a water source through a flexible hose (25) which is carefully positioned to make sure that all of the water (24) is incorporated into the calcined gypsum (20) without splashing onto the side wall (23) of the container, in order to avoid gypsum buildup on the side wall (23). One must also be careful that the free-falling water (24) does not drop to the bottom of the container into contact with the propeller (15) or propeller blade (19) to prevent gypsum buildup thereon.

Another feature of the process of this invention is the flow path of the calcined gypsum (20) after the water (24) is incorporated therein. The blending or mixing action of the propeller (15) is such that a vortex is formed above the propeller (15), and the wetted gypsum is swept downward and around the side wall (23). The wetted gypsum flows around the propeller (15) and then it is swept up the side wall (23) and out the exit port (26). A portion of the wetted gypsum may make more than one pass around the container. The exit port (26) should be located fairly close to the entry port (22) whereby the wetted calcined gypsum travels at least about 270° around the circumference of the container (14). Lumps present in the wetted gypsum may range up to about ⅛ inch in size and they are only damp by the time they pass through the exit port (26) into the exit duct (27) which carries the treated gypsum to the second screw conveyor (13) where it may be recombined with the untreated calcined gypsum. As long as the blending action is continuous, there is little opportunity for gypsum buildup in the blender. In fact, it is believed that there is an area of relatively dry, non-moving, calcined gypsum directly beneath the propeller throughout the blending operation.

This invention will now be further described by reference to a specific example for the purpose of further illustrating and disclosing the operation of the present process and apparatus. It is to be understood that the example is by way of illustration only and in no way is to be construed as a limitation on the present invention.

While the hereinabove describes particularly preferred embodiments, various changes and modifications may be made in the practice of this invention. For example, accelerators, retarders and mixtures thereof for calcium sulfate hemihydrate may be added in standard amounts for their known effects. While various amounts of water, various healing times and various portions of the total stucco board machine feed have been set forth hereinabove, these may vary considerably depending upon the rate of production.

EXAMPLE 1

A portion of calcined gypsum being conveyed from a storage bin to a gypsum board slurry mixer was diverted and continuously passed through a medium energy shearing blender similar to the apparatus illustrated in FIG. 1. The dry calcined gypsum, having a temperature of about 150°–180° F., entered one side of the blender at a rate of about eight tons per hour (which was approximately 75% of the stream) while a small stream of free-falling water was metered into the calcined gypsum stream at a rate of about two gallons of water per minute. Shearing blending was accomplished by mounting a motorboat type of propeller, 10⅜ inches in diameter, in a cylindrical container about twelve inches in diameter and about fifteen inches high. The propeller, which had a 14 inch pitch, was operated at about 300 revolutions per minute, and the mixing action was such that as the water entered and mixed with the calcined gypsum, the wetted calcined gypsum was swept downward and around the container and then up and out the exit port at the top of the container. The treated gypsum then was recombined with the untreated stream and was passed on to a gypsum board slurry mixer for mixing with water and the production of gypsum board.

Having completely described my invention, I claim:

1. A process for preparing calcined gypsum characterized by having a lower water demand which comprises:
    (1) feeding calcined gypsum to a blender, with the gypsum entering the blender container near the top thereof;

(2) adding water to the calcined gypsum immediately after it enters the blender container, said water being incorporated into the calcined gypsum in the form of a free-falling, continuous stream of water which does not directly contact the sidewall of the container or a propeller located in the bottom of said container;

(3) rotating said propeller positioned in the bottom of the blender container and spaced from the bottom of said container;

(4) sweeping the wetted calcined gypsum downward and around the sidewall of the blender container, said wetted gypsum passing around the rotating propeller and then to an exit port located in the sidewall of the container; and (5) removing the wetted calcined gypsum from the blender container through said exit port.

2. A process in accordance with claim 1 in which the free-falling stream of water is added to the calcined gypsum at a rate of about 1 to about 3 gallons per minute, a quantity sufficient to provide from about 1 to about 16% of free water by weight of the gypsum to which it is added in the blender.

3. A process in accordance with claim 1 in which the propeller is rotated at a speed ranging from about 100 to about 500 revolutions per minute.

4. A process in accordance with claim 1 in which the calcined gypsum travels a circumferential distance of at least about 270° from the point where it enters the blender to the exit port where it is removed.

5. A process in accordance with claim 1 in which the exit port is located near the top of the container and near the position where the calcined gypsum enters the container, whereby in step (4) the wetted calcined gypsum passes around the propeller and then upward along the sidewall to the exit port.

6. A process in accordance with claim 1 in which the propeller is rotated at a sufficient speed to form a vortex in the calcined gypsum above the propeller.

7. Apparatus for preparing calcined gypsum wherein water is incorporated into hot calcined gypsum which comprises:

(1) a blender container;

(2) a propeller located in the bottom of said container on a centrally positioned shaft projecting through the bottom;

(3) a motor to rotate said propeller;

(4) an entry port located in the container sidewall and near the top of the blender container;

(5) duct means connected to said entry port and tangentially positioned with respect to the container side wall whereby material passing through the duct means and into the container will tend to pass along the inside surface of the side wall;

(6) water outlet means located above said entry port and inwardly spaced from the container side wall whereby a free-falling stream of water from said outlet will enter material passing through said entry port and will not contact the container side wall or fall into contact with the propeller; and (7) an exit port located near the top of the container to remove the wetted material.

8. An apparatus in accordance with claim 7 in which the propeller is spaced from the bottom of the container whereby material may pass between the propeller and the bottom.

9. An apparatus in accordance with claim 7 in which the exit port is located near the entry port whereby the wetted calcined gypsum travels a circumferential distance of at least about 270° around the blender container prior to removal.

10. An apparatus in accordance with claim 7 in which the container is a cylinder and the propeller blades have a pitch ranging from about 8 inches to about 16 inches.

* * * * *